US010657087B2

(12) United States Patent
Tomlin

(10) Patent No.: US 10,657,087 B2
(45) Date of Patent: May 19, 2020

(54) METHOD OF OUT OF ORDER PROCESSING OF SCATTER GATHER LISTS

(71) Applicant: Toshiba Memory Corporation, Minato-ku, Tokyo (JP)

(72) Inventor: Andrew J. Tomlin, San Jose, CA (US)

(73) Assignee: Toshiba Memory Corporation, Tokyo (JP)

(*) Notice: Subject to any disclaimer, the term of this patent is extended or adjusted under 35 U.S.C. 154(b) by 40 days.

(21) Appl. No.: 15/994,252

(22) Filed: May 31, 2018

(65) Prior Publication Data

US 2019/0370199 A1 Dec. 5, 2019

(51) Int. Cl.
| | |
|---|---|
| *G06F 13/28* | (2006.01) |
| *G06F 3/06* | (2006.01) |
| *G06F 12/0862* | (2016.01) |
| *G06F 13/16* | (2006.01) |
| *G06F 13/00* | (2006.01) |

(52) U.S. Cl.
CPC .............. *G06F 13/28* (2013.01); *G06F 3/061* (2013.01); *G06F 3/0659* (2013.01); *G06F 3/0673* (2013.01); *G06F 12/0862* (2013.01); *G06F 13/1668* (2013.01)

(58) Field of Classification Search
CPC ............ G06F 13/28; G06F 12/08; G06F 3/06
USPC ....................................................... 710/22
See application file for complete search history.

(56) References Cited

U.S. PATENT DOCUMENTS

| | | | | | |
|---|---|---|---|---|---|
| 6,701,393 | B1* | 3/2004 | Kemeny | ............... | G06F 12/122 710/40 |
| 8,495,301 | B1* | 7/2013 | Alexander | .............. | G06F 13/28 710/22 |
| 8,645,623 | B1* | 2/2014 | O'Shea | ............... | G06F 12/0866 711/100 |
| 9,501,436 | B1* | 11/2016 | Bruce | ...................... | G06F 13/28 |
| 9,778,858 | B1* | 10/2017 | Prasad | .................. | G06F 3/0613 |
| 9,959,227 | B1* | 5/2018 | Diamant | ................ | G06F 13/28 |
| 2008/0104341 | A1* | 5/2008 | Ihara | ....................... | G06F 13/28 711/154 |
| 2008/0168259 | A1 | 7/2008 | Biran et al. | | |
| 2016/0291868 | A1* | 10/2016 | Halaharivi | ............. | G06F 3/061 |
| 2016/0292100 | A1 | 10/2016 | Olcay et al. | | |

(Continued)

OTHER PUBLICATIONS

International Search Report and Written Opinion in corresponding PCT/IB2019/000656 dated Nov. 20, 2019.

*Primary Examiner* — Christopher B Shin
(74) *Attorney, Agent, or Firm* — White & Case LLP

(57) ABSTRACT

A semiconductor storage device includes a controller including a data direct memory access (DDMA) controller. The controller receives a plurality of read commands segmented into data transfer descriptors associated with data tags from a host device and directs a plurality of the data transfer descriptors to the DDMA controller. The DDMA controller pre-fetches one or more descriptors from the host device associated with one or more of the plurality of data tags, a first data tag having an associated number of descriptors corresponding to contiguous blocks of memory. The DDMA controller determines if the associated number of descriptors satisfies a threshold, and, if it does not, moves the first data tag to a first list, when at a head of the first list moves the first data tag to a second list, and when at a head of the second list, transmits the data associated with the first data tag.

20 Claims, 19 Drawing Sheets

(56) References Cited

U.S. PATENT DOCUMENTS

2017/0075815 A1* 3/2017 Miyamoto .......... G06F 12/1009
2018/0300634 A1* 10/2018 McBride .................. G06N 3/10

* cited by examiner

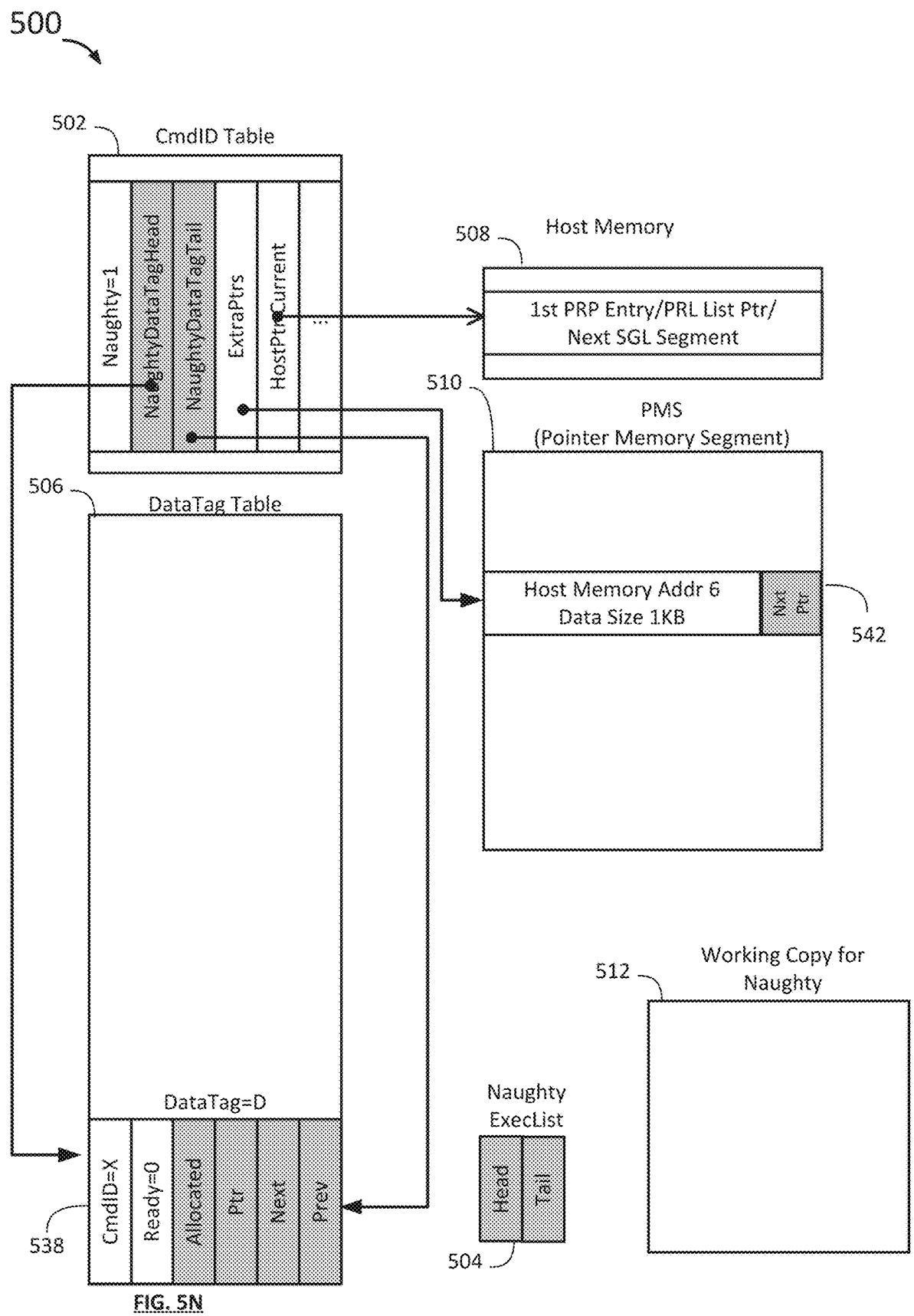

US 10,657,087 B2

METHOD OF OUT OF ORDER PROCESSING OF SCATTER GATHER LISTS

FIELD OF THE INVENTION

The present invention generally relates to systems and methods for processing read commands.

BACKGROUND OF THE INVENTION

The performance of a semiconductor storage device, such as a solid state drive (SSD), is greatly impacted by the speed of processing read commands. To increase read command processing speed and limit latency, some systems use a system of pre-fetching descriptors for data tags received from a host and storing them in the local RAM until the described data is processed. Read commands received from a host can be described by Physical Region Page (PRP) format request, or can be in the form of a Scatter Gather List (SGL). The SGL allows more flexibility in describing the location of data to transfer, but allows the use of any number of descriptors to describe the data transfer.

In most cases, a SGL data descriptor format used by a host describes a data transfer using a small number of descriptors, but in some cases, an SGL format command includes a large number of descriptors associated with the transfer. In such cases, systems which use pre-fetching of descriptors quickly use up all available local memory space attempting to pre-fetch and store the descriptors associated with the atypically large number of SGL data descriptors for a data tag. Further, the processing of the atypical SGL takes much longer than processing of typical, short data descriptors. Processing the atypical SGL data descriptors blocks the processing of the typical data tags described by a small number of descriptors and causes inefficient use of the buffers and memory of the device, slowing down the overall transfer rate.

Accordingly, there is an unmet need to design systems capable of efficiently processing data in a scatter gather list.

BRIEF DESCRIPTION OF THE INVENTION

In an aspect, a semiconductor storage device includes a controller including a data direct memory access (DDMA) controller. The controller receives a plurality of read commands from a host device, where the plurality of read commands are segmented into a plurality of data tags associated with a plurality of data transfer descriptors. The DDMA controller receives the plurality of data transfer descriptors and pre-fetches one or more descriptors from the host device associated with one of more of the plurality of data tags, a first data tag having an associated number of descriptors corresponding to contiguous blocks of memory. The DDMA controller also determines if the number of descriptors associated with the first data tag satisfies a threshold amount, and if it does not, moves the first data tag to a first list, and when the first data tag reaches a head of the first list and data associated with the first data tag is ready to be transferred, moves the first data tag to a second list. When the first data tag is at the head of the second list, the DDMA controller transmits the data associated with the first data tag.

In another aspect, a method of fetching direct memory access (DMA) descriptors for commands to a semiconductor storage device includes for a first command segmented into a plurality of data tags and including a plurality of data transfer descriptors, at a head of a command list in an on-chip Random Access Memory (RAM) includes determining a number of descriptors associated with a first data tag describing the first command, the number of descriptors corresponding to contiguous blocks of memory, and comparing the number of descriptors associated with the first data tag to a threshold value. If the number of descriptors associated with the first data tag does not satisfy the threshold value, the method includes processing the first data tag by storing the first data tag in a first list, and when the data associated with the number of descriptors is ready, moving the first data tag to a second list. The method further includes fetching a plurality of additional descriptors associated with the first data tag, and executing a data transfer of the data associated with the first data tag when it reaches the head of the second list.

BRIEF DESCRIPTION OF THE FIGURES

FIG. 5N shows a step in the processing of a plurality of typical and atypical data descriptors.

DETAILED DESCRIPTION OF THE INVENTION

Figure 1:
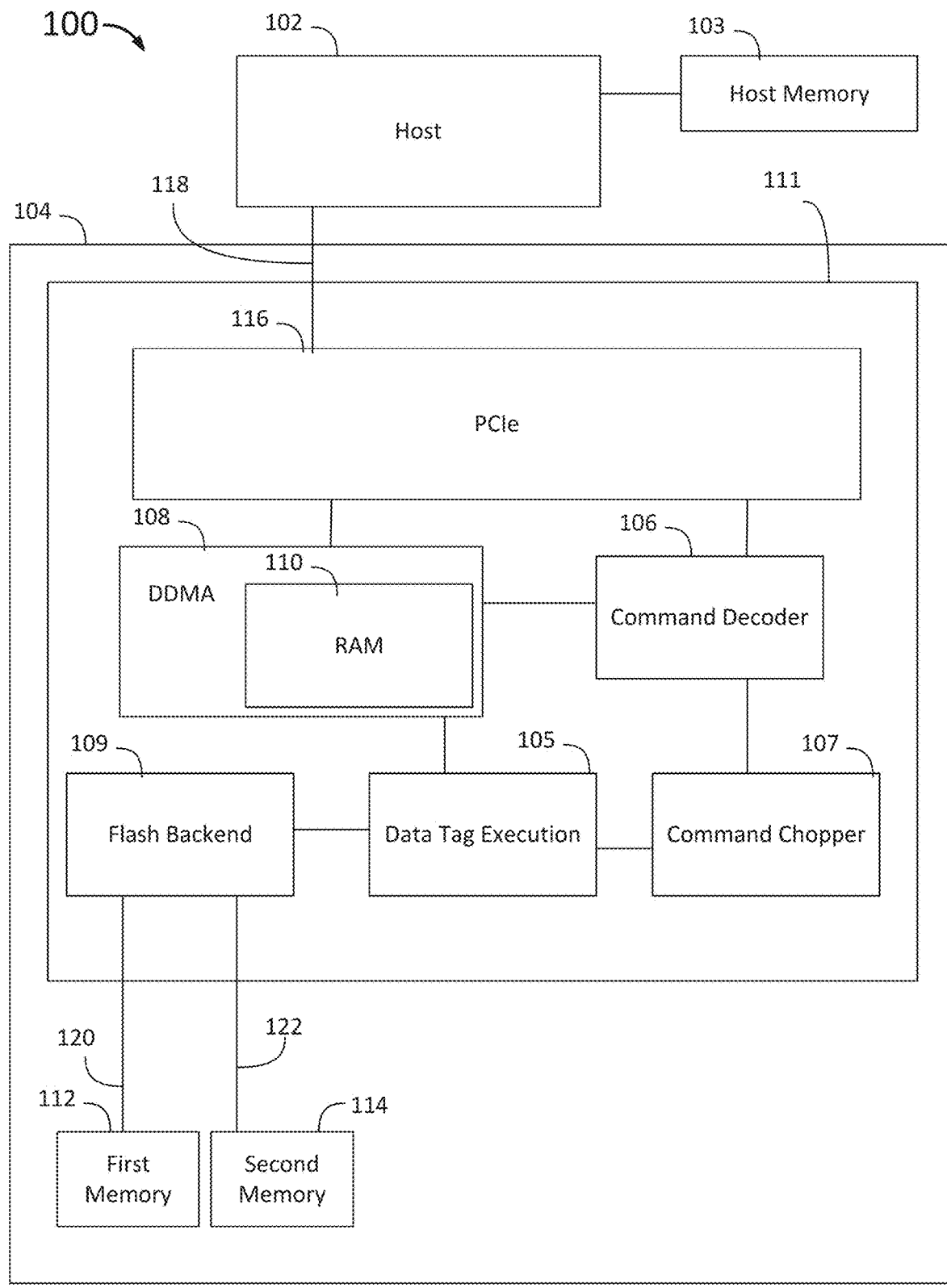
FIG. 1 shows a block diagram of solid state memory system.

FIG. 1 shows a block diagram of semiconductor storage system 100. The semiconductor storage system 100 includes a host 102, a host memory 103, a solid state drive (SSD) 104, a semiconductor chip 111, and a Peripheral Component Interconnect (PCIe) core 116. The semiconductor chip 111 includes a data direct memory access (DDMA) controller 108 having an internal random access memory (RAM) 110, a command decoder 106, data tag execution controller 105, command chopper 107, and flash backend 109. The flash backend 109 is communicatively coupled to a first memory 112, and a second memory 114, which may be flash memories or any other memory type. The PCIe 116 communicatively couples to the host 102 through the host interface 118. The DDMA controller 108 communicatively couples to the PCIe 116 and to the command decoder 106. The command decoder 106 communicatively couples to the command chopper 107, which communicatively couples to the data tag execution controller 105. The data tag execution controller 105 is also communicatively coupled to the DDMA controller 108 and to the flash backend 109. Though the flash backend 109 is only illustrated as connected to two memories located on the SSD, the flash backend 109 can be coupled to any number of internal or external memories.

The PCIe 116 receives commands from the host 102 via host interface 118 and transmits them to the command decoder 106. The command decoder 106 decodes the commands and readies the commands for the rest of the command handling system. The command decoder 106 transfers the commands to the DDMA controller 108, which manages the host transfer execution, including fetching descriptors and out of order SGL execution, discussed below. The DDMA controller 108 communicatively couples to the command chopper 107, which divides commands into portions comprising data tag pieces. The command chopper 107 is communicatively coupled to both the data tag execution controller 105 and DDMA controller 108. The data tag execution controller 105 manages the execution of the data tags produced by the command chopper 107. Each read command is separated into a number of data tags by the command chopper 107, each data tag having an associated number of descriptors which describe the location of the requested data. Commands and descriptors are stored by the host 102 in the host memory 103. The DDMA controller 108 performs 'pre-fetching' by pulling the descriptors associated with the commands from the host memory 103 and into the DDMA controller 108. The descriptors are stored in the RAM 110, and are handled by the DDMA in the data tag sized pieces produced by the command chopper 107. The data tag execution controller 105 manages the execution of the data tags, including requesting the associated data from the flash backend 109. When the data has been retrieved from the first memory 112 and the second memory 114, the data is transferred to the host 102.

The DDMA controller 108 receives commands which have PRP or SGL descriptors, and maintains lists in the RAM 110 to store the PRP and SGL descriptors, and maintains lists in the RAM 110 to tore the PRP and SGL descriptors. The DDMA controller 108 further pre-fetches the descriptors from the host 102, and issues data transfer (DMA) requests for data transfer, allowing for out of order transfer with prefetched PRP and SGL descriptors in typical conditions where the number of descriptors describing a data tag satisfies a threshold. Pre-fetching descriptors reduces the overall latency of the system. The pre-fetching of descriptors and processing commands out of order can lead to a 10-20% improvement in performance over systems which do not pre-fetch or process data descriptors out of order.

PRP format descriptors have a single pointer by default and the DDMA controller 108 processes these by pre-fetching the descriptors and transferring the requested data when it becomes available. SGL format descriptors can be used to describe non-contiguous blocks of data, and while SGL commands typically have one or two descriptors per data tag, in some atypical cases can have any number of descriptors associated with a data tag. In these atypical cases, the data tags cannot have descriptors pre-fetched because storing the pre-fetched descriptors would consume an overly large amount of the on-chip RAM 110. In this atypical case, the memory restriction means the data tags cannot be processed out of order. Attempting to include atypical data tags in the out of order processing algorithm causes the processing of typical data tags to be blocked and results in an inefficient system having high latency.

Figure 2:
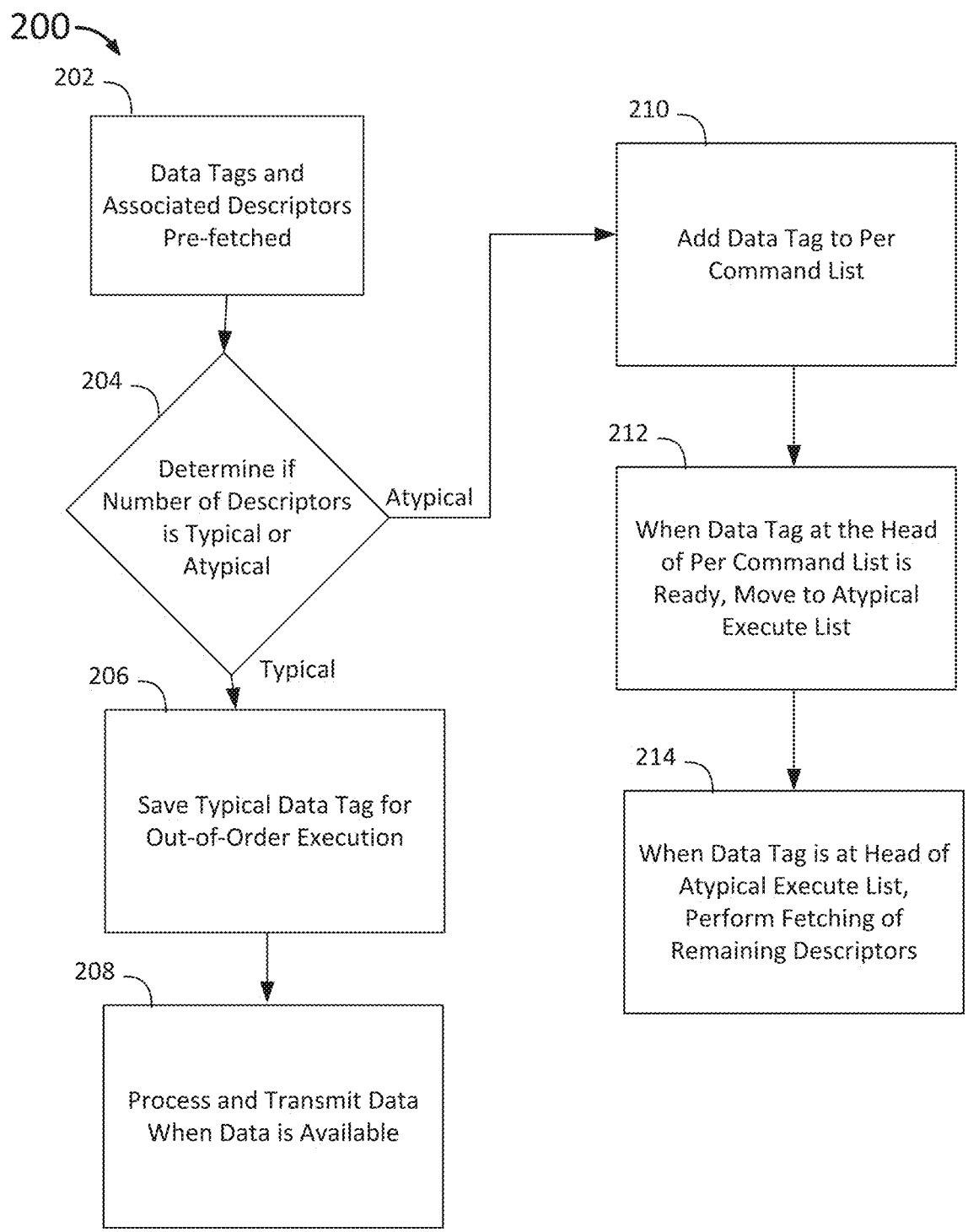
FIG. 2 shows a decision chart for processing read commands.

FIG. 2 shows a decision chart for the process by which the DDMA controller 108 processes read commands. The DDMA controller 108 receives the commands and data tags describing the commands from the PCIe 116 and the command decoder 106, and stores the data tags or data transfer requests for the commands 106 in the RAM 110. At step 202, the DDMA controller 108 fetches a preset number of descriptors for the data tag. Any unused descriptors are saved for subsequent data tags. Pre-fetched descriptors are stored in the RAM 110. Typically, the DDMA controller 108 retrieves a set allocation of descriptors associated with the data tags from the host 102, for example 64 bytes of descriptors at a time. Not all descriptors retrieved by the DDMA controller are necessarily required for a given or data tag or 'data transfer request'. The unused descriptors are stored in a list in the local RAM 110 in the descriptors memory segment, termed the descriptors memory segment list.

At step 204, the DDMA controller 108 determines if the number of descriptors associated with the first data tag exceeds a pre-set threshold. If the number of descriptors associated with the data tag exceeds the threshold, the data tag is considered atypical as it includes too many descriptors to be processed with the typical data tags having a number of associated descriptors which does not exceed the threshold. Atypical data tags are processed separately by a different method than typical data tags.

At step 206, typical data tags are saved for out of order processing in the RAM 110, while the DDMA controller 108 processes the typical data tags by retrieving the data associated with the descriptors. The data is retrieved by the flash backend 109 from the first memory 112 and the second memory 114 over first communication channel 120 and second communication channel 122. In some implementations, when the data is available in the flash backend 109, the ready bit in the data tag is set, and the typical data tag is moved to the execute list, though in other implementations that typical data tag is not moved to a list. At step 208, when the data is available, the DDMA controller 108 transfers the data associated with the typical data tag to the host 102, via command controller 106 and host interface 118.

The DDMA controller 108 transfers the data associated with the typical data tag to the host 102 when the data is ready, regardless of an order in the out of order processing list. Transferring the data associated with typical data tags when ready instead of in order ensure that the data is efficiently transferred and that buffers are not idle during processing of commands. The out of order processing and transfer of typical data tags increases the efficiency of processing and enables the device to be consistently transmitting data to the host, without being held up waiting for a data tag at the head of the out of order processing queue to be processed.

By removing atypical data tags having too many descriptors and processing them separately, the atypical data tags can be removed from the out of order processing and can instead be processed in order starting at step 210. At step 210, the DDMA controller 108 adds the atypical data tag to the tail of a per command list stored in the RAM 110, where the atypical data tag awaits processing. At step 212, when the atypical data tag reaches the head of the per command list and is ready, the DDMA controller 108 moves the data tag to the atypical execute list to await its turn to be processed.

At step 214, when the data tag is at the head of the atypical execute list, the DDMA controller 108 fetches any remaining descriptors that were not pre-fetched in step 202. The DDMA controller 108 stores the descriptors with the previously pre-fetched descriptors in an atypical command descriptor list in the RAM 110. The DDMA controller 108 retrieves the data associated with the pre-fetched and fetched descriptors for the atypical data tag, and transfers the data associated with the atypical data tag to the host 102, via command controller 106 and second host interface 118.

The DDMA controller 108 processes the atypical data tag in order and separately than the typical data tags, so that the atypical data tags do not slow down the processing of the typical data tags, preventing the need for large buffers. Atypical data tags may be described by SGLs having many descriptors, while typical data tags may be described by SGLs having an expected number of descriptors for the system. For example, in one embodiment, a typical data tags may have two descriptors. An atypical data tag may have any number of descriptors above a threshold value set in a hardware register of the system. In an example, a 1 MB command may be described by a single 1 MB descriptor, and an atypical 1 MB command has 1,000 associated 1 KB descriptors. Pre-fetching and storing the 1,000 descriptors would consume the on-chip RAM 110, so the DDMA controller processes the atypical data tags separately and without pre-fetching all descriptors, as shown in FIG. 2.

Figure 3:
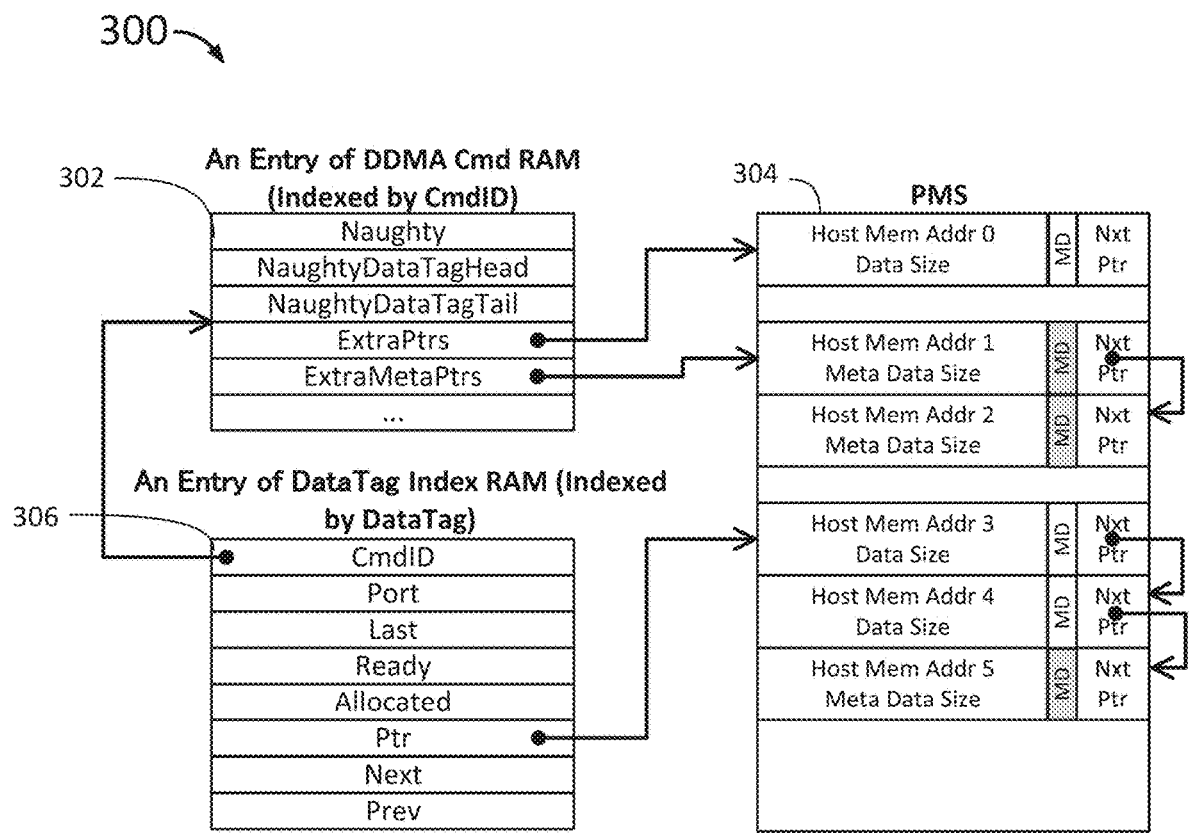
FIG. 3 shows a block diagram of the processing of an atypical data descriptor associated with a read command.

FIG. 3 shows a data structures diagram 300 of the processing of data tags associated with a read command as processed by the DDMA controller 108. The DDMA controller 108 stores information specific to each received command in the RAM 110 with the information shown in command ID segment 302, including an identification showing whether the data tag is typical or is atypical, and thus considered to be 'naughty,' and an indication of the start and end of the data tag list (the so called first list) which is atypical, and an address of where the pre-fetched descriptors are stored in the RAM 110.

The DDMA controller 108 further stores the data tag information in a list 306 in the RAM 110, the data tag information list 306 including the command identification, a port identification, a ready bit, an indication of whether the data tag has been allocated, an address for where the descriptors for the data tag have been stored. The ready indicator (or ready bit) indicates whether the associated data is available for transfer. The allocated indicator indicates if all descriptors including both data and metadata are available for the data tag. The list includes indexes to a list of descriptors in the RAM 110.

The DDMA controller 108 stores the descriptors associated with the data tag in a pointer memory segment list 304 in the RAM 110. The descriptor memory segment list 304 has a limited amount of space for storage of descriptors, such that when the descriptor memory segment list is full, no further descriptors can be added to the list until some descriptors are removed by transferring the associated data to the host 102. Processing one atypical data tag at a time further prevents the RAM 110 from becoming overrun and prevents the buffers from being used up by atypical data tags at the expense of typical data tags. In some implementations, only one buffer is used at a time for the processing of atypical data tags. The descriptors are stored with an indication of whether the descriptors further correspond to another descriptor. For example, host memory address 1 points to associated pointer host memory address 2.

The DDMA controller 108 maintains the plurality of lists per port and execution of the commands is distributed among the ports of the SSD 104.

Figure 4:
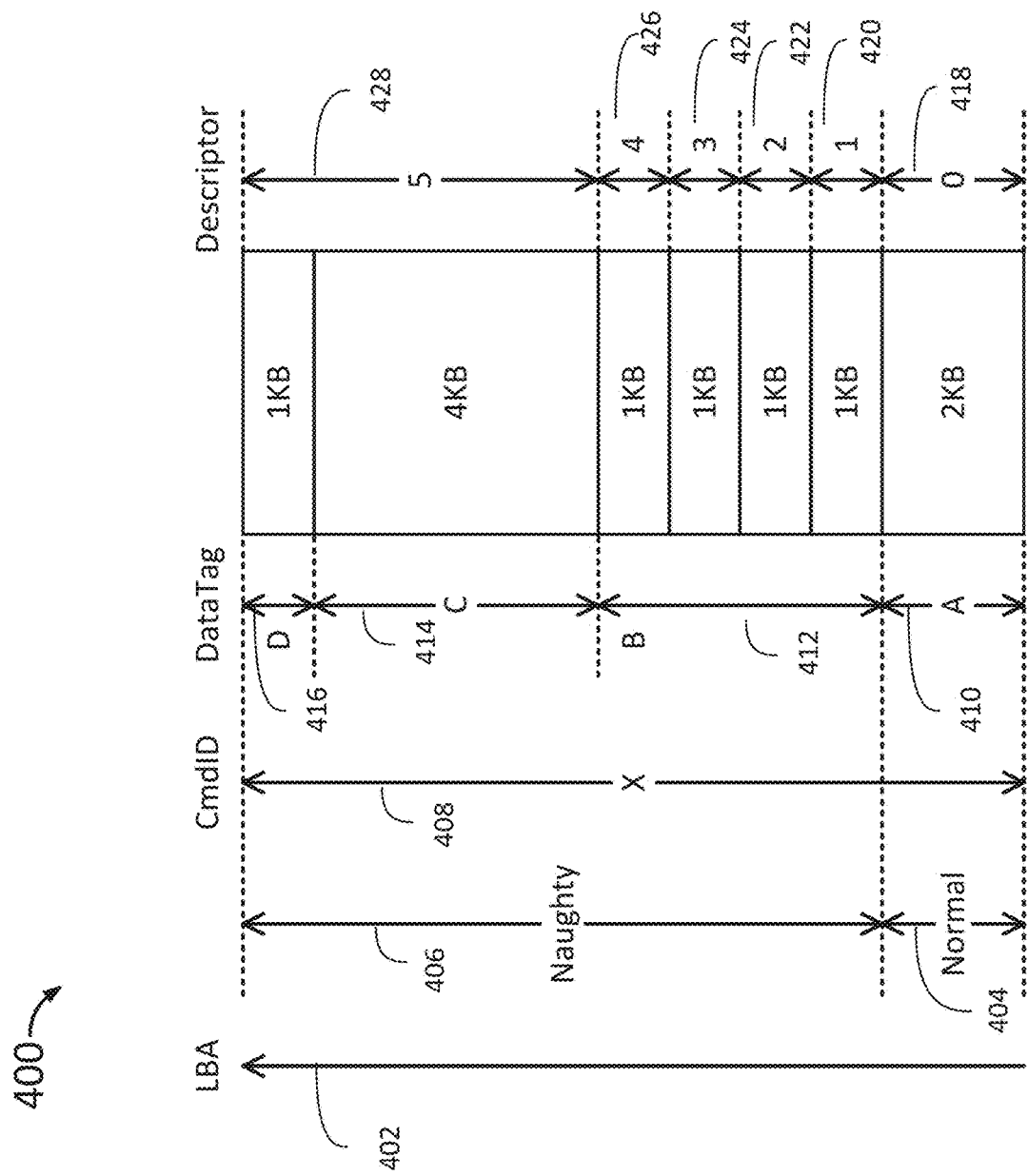
FIG. 4 shows a diagram of a queued read command.

FIG. 4 shows a diagram 400 of a queued read command 408 having typical and atypical data descriptor portions. The vertical axis shows an increasing logical block address (LBA) associated with the command 408 is illustrated as 402. The read command 408 includes a first command state 404 which is "typical" and a second command state 406 which is "atypical." The first command state 404 has a first data tag A 410, and is described by data descriptor '0' 418 which is 2 KB in size, the data descriptor '0' 418 is also referred to as a pointer herein. The first command state 404 described by data tag A 410 is a typical command that can be processed using out of order processing as described above with regard to FIG. 2. The read command 408 is 11 KB in total and is described by four data tags and six descriptors of various sizes. For simplicity, it is assumed that the read command 408 has no metadata.

The second command state 406 is described by three data tags, data tag B 412, data tag C 414, and data tag D 416. Data tag B 412 has four associated descriptors of 1 KB each, data descriptor '1' 420, data descriptor '2' 422, data descriptor '3' 424, and data descriptor '4' 426. Data tag C 414 and data tag D 416 are associated with a single descriptors, data descriptor '5' 428 which is 5 KB in total in size. Data descriptor '0' 418, data descriptor '1' 420, data descriptor '2' 422, data descriptor '3' 424, data descriptor '4' 426, and data descriptor '5' 428 must be read in order by the DDMA controller 108. Using SGL descriptors, the information necessary for the transfer of data tag D 416 can only be apparent after pre-processing data tag A 412, data tag B 414, and data tag C 414 to find the descriptors associated with these data tags which correspond to associated data tag D 416.

Because data tag B 412 has more than a threshold number (in this example two associated descriptors), data tag B 412 is determined to be atypical ("naughty") and will be processed in order according to FIG. 2. Data tags C 414 and D 416 are subsequent to data tag B 412, and therefore are also atypical ("naughty") and will also be processed by this method. Even if one of data tag C 414 or data tag D 416 are typical, and have a number of associated descriptors less than a threshold amount, all subsequent data tags in a command following an atypical data tag are handled by the atypical data transfer request method. Because data tags subsequent to an atypical data tag are handled according to the in order processing method, all subsequent data tags associated with the same command are added to the end of the per command list and designated as naughty.

As shown in FIG. 3, the data tags are associated with the data descriptors, or pointers, that describe the locations of the data. Data tags and descriptors are stored in the local RAM 110 in lists which are updated as data tags are processed by the DDMA controller 108. The data tags reference the descriptors required to transform the data tag to an independent data structure. However, atypical command portions which include data tags referencing too many descriptors cannot have pre-fetched descriptors stored in the RAM 110 without consuming the majority of the available on-chip memory. If the RAM 110 was entirely consumed by the pre-fetched descriptors for the data tags in the naughty portion of the command, there would be no available memory for processing other typical data tags, and once any data in the queue of already completed data tags was transferred to the host 102, there would be no transfer of data until the atypical data tag finished processing. Additionally, if the remaining descriptors not pre-fetched for an atypical data tag were fetched in order, the back end buffers would be busy fetching the large number of descriptors and would be unavailable for pre-fetching other typical data tags, thereby slowing the system down. A system behaving in this manner would be very inefficient.

Whether the data tag is typical or atypical is determined by the number of descriptors per retrieved amount of data in a data tag. In an example, the DDMA controller retrieves data tags in multiples of 4 KB, based on the configuration of the command from a queue of data tags transmitted by the data tag execution controller 105. The typical command threshold limit is based on a single 4 KB data tag, and larger data tags are scaled base on multiples of this size. The number of descriptors in the data tag determines whether the data tag will be processed as a typical data tag using out of order processing, or if it will be processed as an atypical ("naughty") data tag using in-order processing.

FIGS. 5A-5M illustrate the handling of the command shown in FIG. 4 according to the process illustrated in FIG. 2.

Figure 5A:
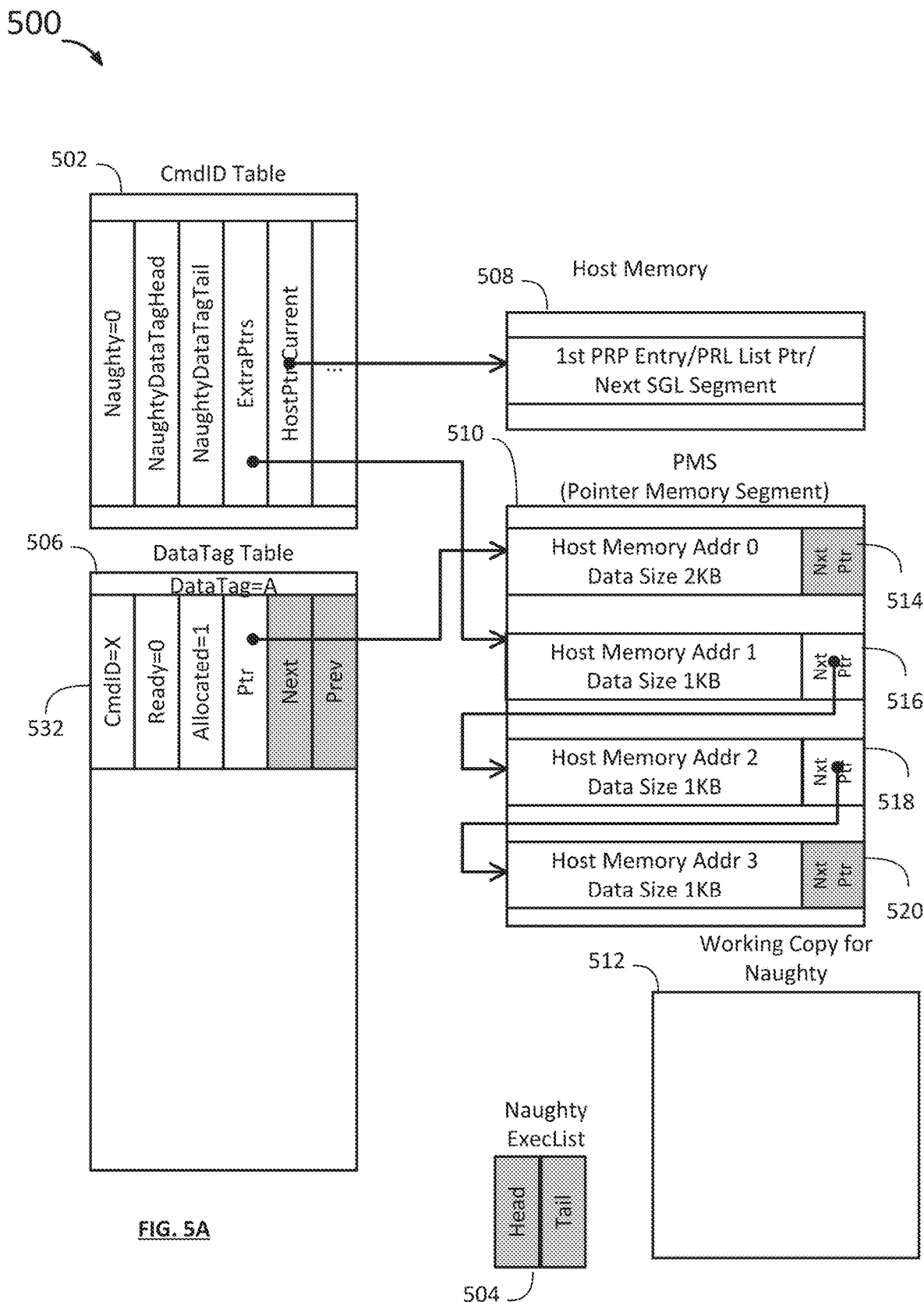
FIG. 5A shows a diagram of the processing of a plurality of typical and atypical data descriptors.

FIG. 5A shows a first step illustrated by the plurality of lists 500 in processing the data tags of FIG. 4. The plurality of lists 500 includes the command ID table 502, the data tag index memory 506, the command transfer data from the host memory 508 received by the DDMA controller 108 from the command controller 106, the descriptors memory segment 510, the working copy atypical command list 512, and the naughty execution list 504 for use with atypical data tags. The command ID table 502 is indexed by a command ID identifying the properties of the command. The descriptor memory segment 510 contains multiple lists. In this first step, fetching of the initial set of descriptors from the host has already occurred, and data tag A 532 is processed by the DDMA controller 108. In the command ID table 502, the naughty indicator is set to 0, the next descriptor to be fetched from the host is indicated by the command transfer data from the host memory 508, and the extra descriptors which were retrieved by the DDMA controller 108, but do not describe the first data tag A 532 (descriptors 516, 518, 520) are indicated as being stored in the descriptor memory segment 510 on the extra descriptors list.

DDMA controller 108 pre-fetches a pre-set amount of descriptors for the processing of the first data tag A 532, which includes the 2 KB data descriptor '0' 514 associated with data tag A 532, as well as 1 KB data descriptor '1' 516, 1 KB data descriptor '2' 518, and 1 KB data descriptor '3' 520. Data descriptor '0' 514 fully describes data tag A 532, and does not correspond to any additional descriptors. 1 KB data descriptor '1' 516, 1 KB data descriptor '2' 518, and 1 KB data descriptor '3' 520 are extra descriptors that do not describe data tag A 532 and are stored in the descriptor memory segment 510 with 1 KB data descriptor '1' 516 referencing 1 KB data descriptor '2' 518 as the next descriptor, and 1 KB data descriptor '2' 518 referencing 1 KB data descriptor '3' 520 as the next descriptor. All data descriptors are stored in the descriptor memory segment 510, while data tag A 532 is stored in the data tag memory 506 with a reference to the location of the data descriptor '0' 514 in the descriptor memory segment 510.

Figure 5B:
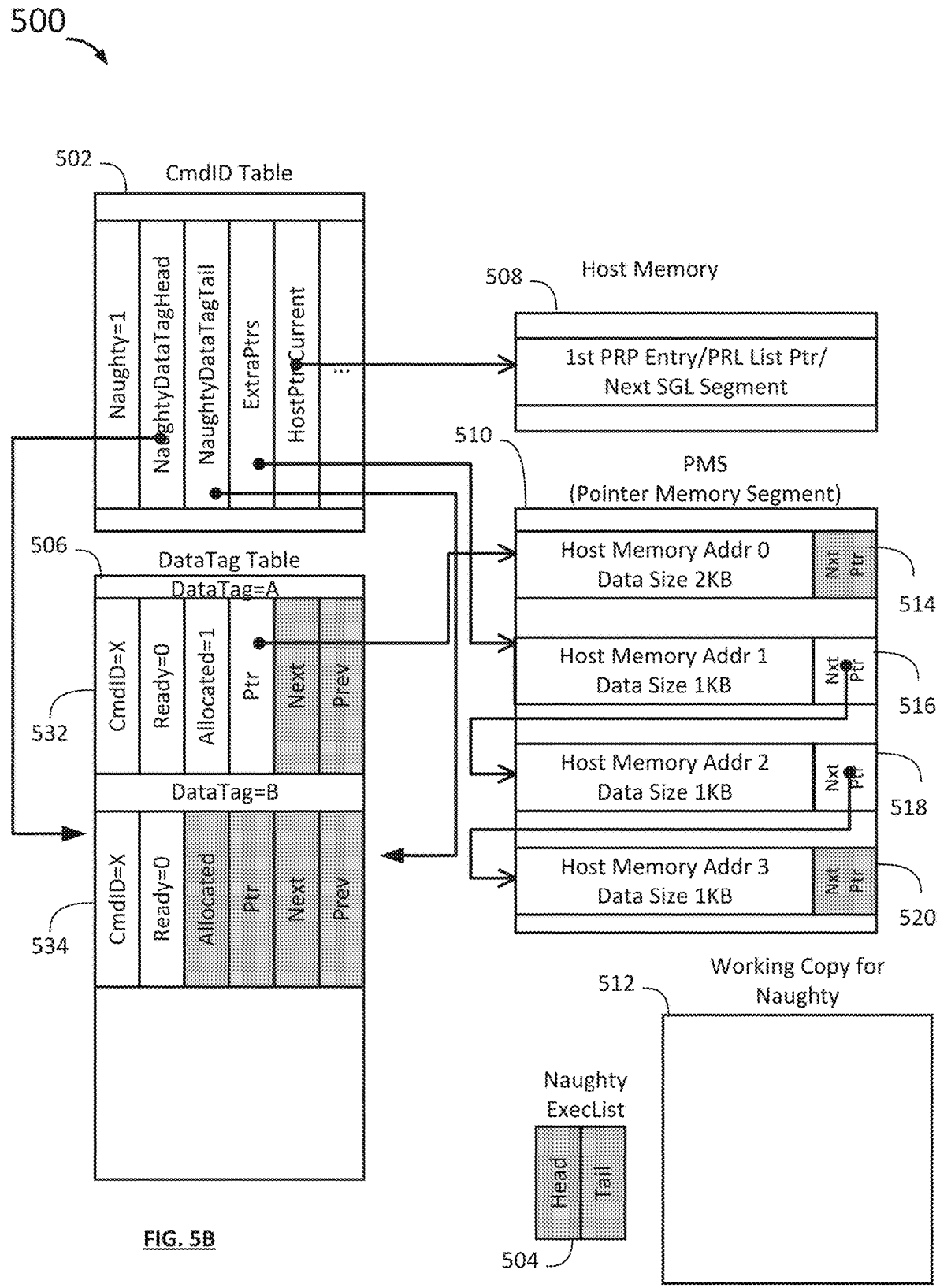
FIG. 5B shows a step in the processing of a plurality of typical and atypical data descriptors.

FIG. 5B illustrates the next step in processing the read command of FIG. 4. The DDMA controller 108 retrieves data tag B 534 and processes the already fetched descriptors associated with data tag B 534, determining that the number of descriptors exceeds the threshold set in the hardware register and is therefore considered atypical or "naughty." The DDMA controller 108 indicates in the command ID table 502 that the command is considered atypical or "naughty" in the command ID table 502 and stores data tag B 534 in the data tag memory 506 as part of a per command list. The pre-fetched descriptors associated with data tag B 534 previously retrieved with data tag A 532 are stored in the descriptor memory segment 510, and no additional descriptors are pre-fetched for data tag B534 at this time.

The threshold value of the acceptable number of typical descriptors could be any number of descriptors depending on the size of the local RAM 110 available for pre-fetching descriptors. In some embodiments, the threshold is set to two descriptors. In other embodiments, the threshold is set to three, four, or more descriptors. Increasing the number of acceptable descriptors set as the threshold uses more memory, and may require additional memory to be added to the device, increasing the size of the device. In some embodiments, external RAM is used to store pre-fetched descriptors, however use of external RAM increases the latency of the system. In some embodiments, external RAM is included as an overflow for storing pre-fetched descriptors in combination with the described algorithm.

Figure 5C:
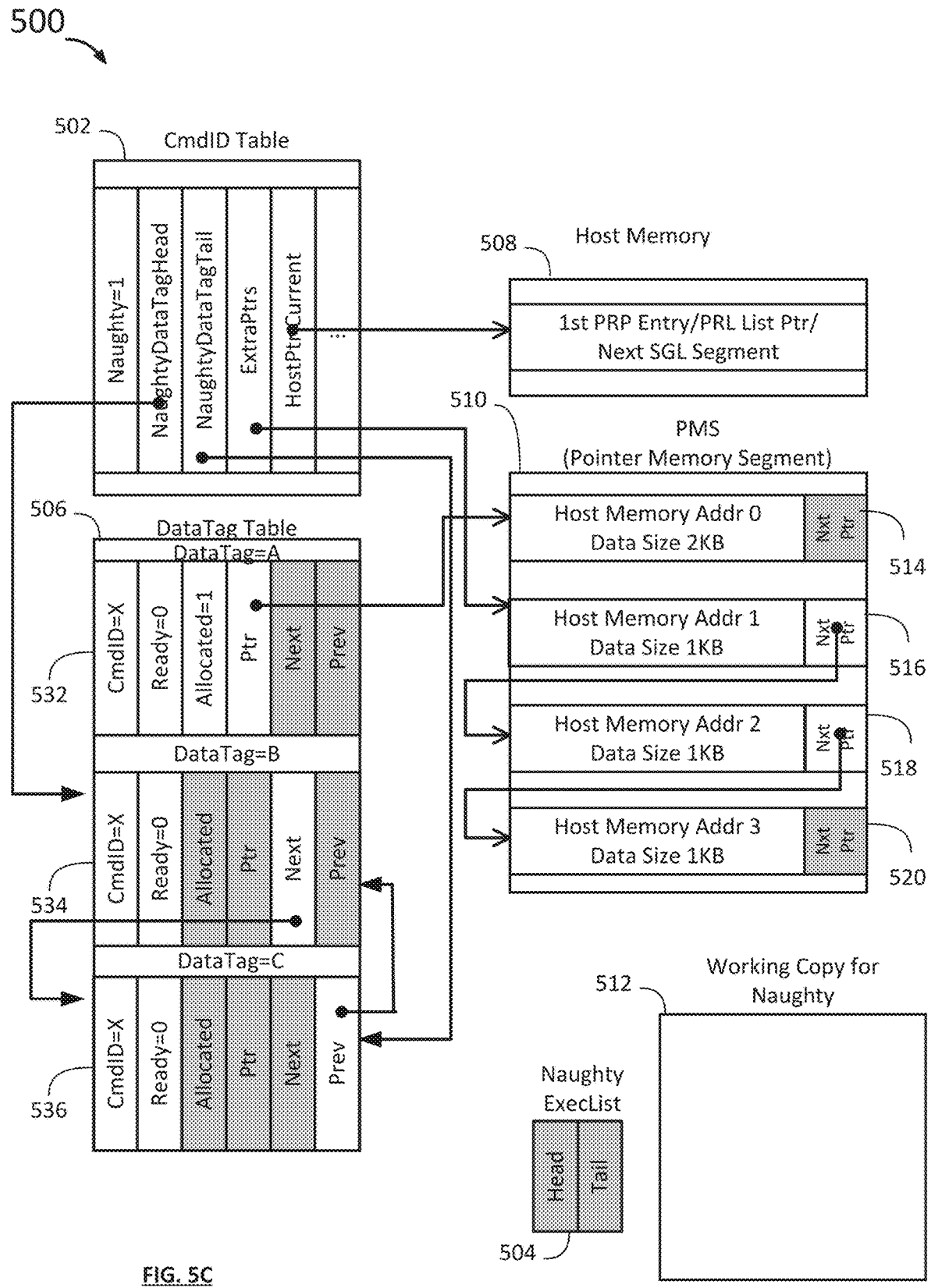
FIG. 5C shows a step in the processing of a plurality of typical and atypical data descriptors.

Typical SGL data tags have a single descriptor, or in some cases two descriptors. While the data tags and descriptors described here are associated with data for a read command, the algorithm to determine whether the data tag will be processed out of order or in order can be applied to other tags described by other types of descriptors such as metadata descriptors. In some implementations, the data descriptors include metadata descriptors, and the metadata descriptors are counted in the number of descriptors to be compared to the threshold value to determine whether a data tag is considered atypical. In some implementations, the data descriptors include metadata descriptors, and the metadata descriptors are not counted in the number of descriptors to be compared to the threshold value FIG. 5C illustrates the next step in processing the read command of FIG. 4. The DDMA controller 108 retrieves data tag C 536 and as the command is already considered naughty, adds it to the data tag memory 506 as part of the per command list, following data tag B 534 in the per command list. Because data tag C 536 follows data tag B 534. In some embodiments, the per command list can be replaced with a per port naughty list which would reduce efficiency of the request processing but save memory Like data tag B 534, data tag C 536 is identified as atypical and the command ID table 502 identifies data tag C 536 as the new end, or tail, of the atypical or naughty data command.

Figure 5D:
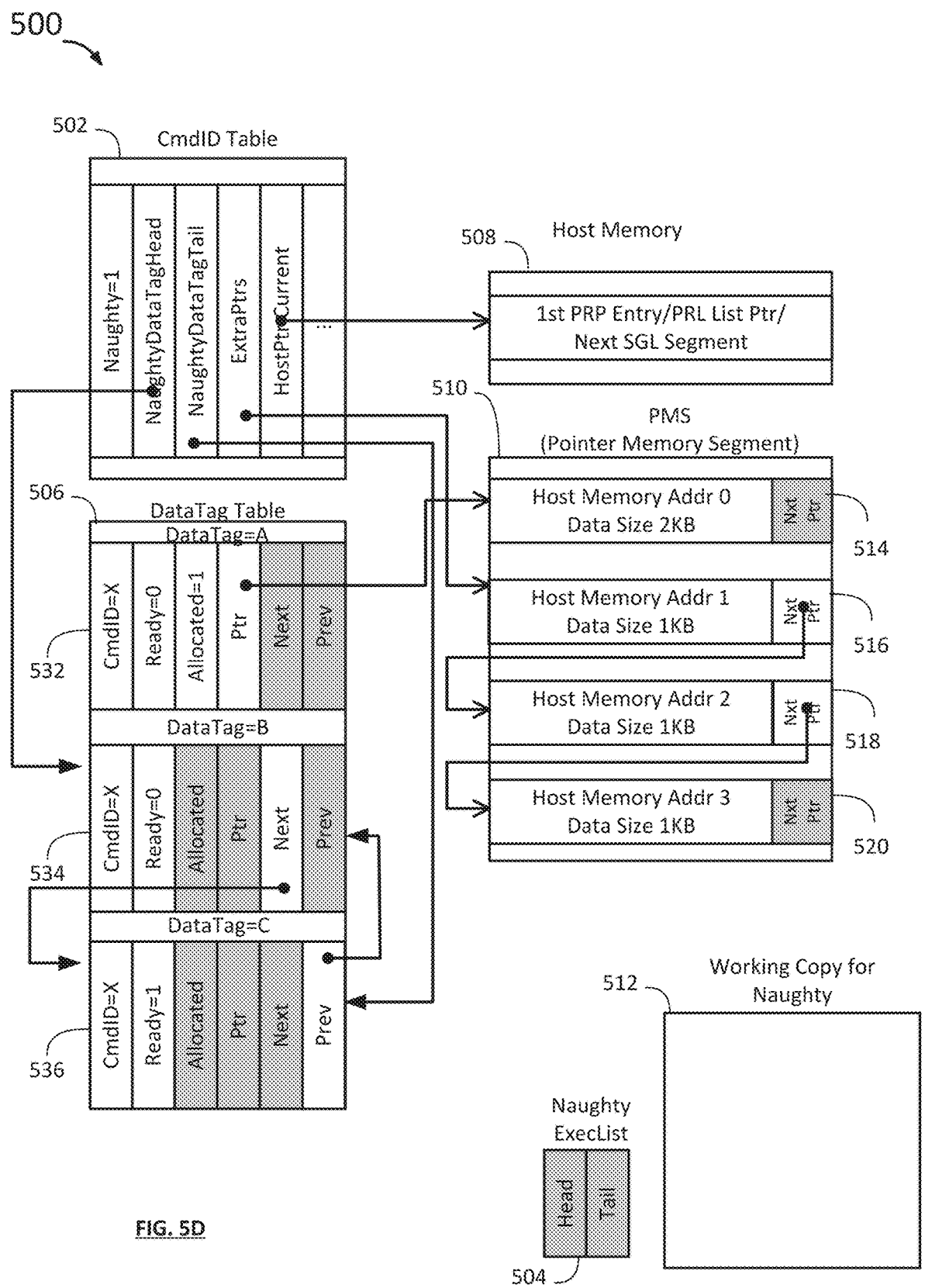
FIG. 5D shows a step in the processing of a plurality of typical and atypical data descriptors.

FIG. 5D illustrates the next step in processing the read command of FIG. 4. Data tag C 536 becomes ready and the ready bit for data tag C 536 is set to ready. However, because the command is atypical, data tag C 536 cannot be processed out of order and must wait for data tag B 534, the head of the atypical command, to become ready and be processed.

Figure 5E:
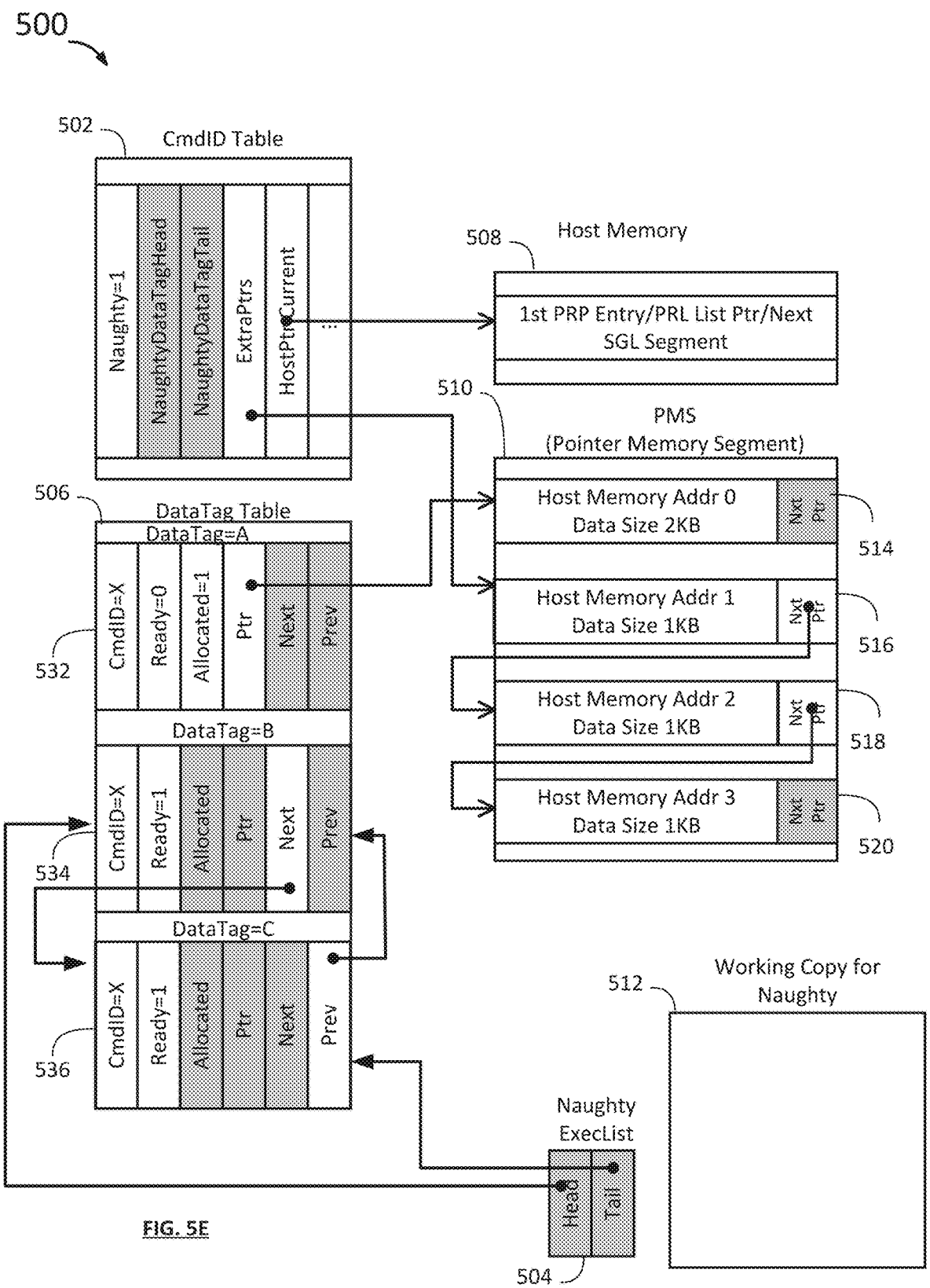
FIG. 5E shows a step in the processing of a plurality of typical and atypical data descriptors.

In FIG. 5E, data tag B 534 now becomes ready and the ready bit for data tag B 534 is set to ready. Because data tag B 534 is the head of the naughty portion of the command in the data tag memory 506, the DDMA controller 108 adds it to the naughty execution list 504. Data tag C 536 is also ready and the DDMA controller 108 also adds it to the naughty execution list 504.

The DDMA controller 108 moves the data tag B 534 and data tag C 536 from the per command list in the data tag memory 506 to the naughty execution list 504 when data tag B 534, the head of the naughty portion of the command and head of the per command list in the data tag memory 506, is ready. By waiting until the head of the naughty command portion is ready for data transfer before moving the command to the naughty execution list 504 and fetching remaining data descriptors, other typical data tags are not held up by the processing of the atypical data tags.

Figure 5F:
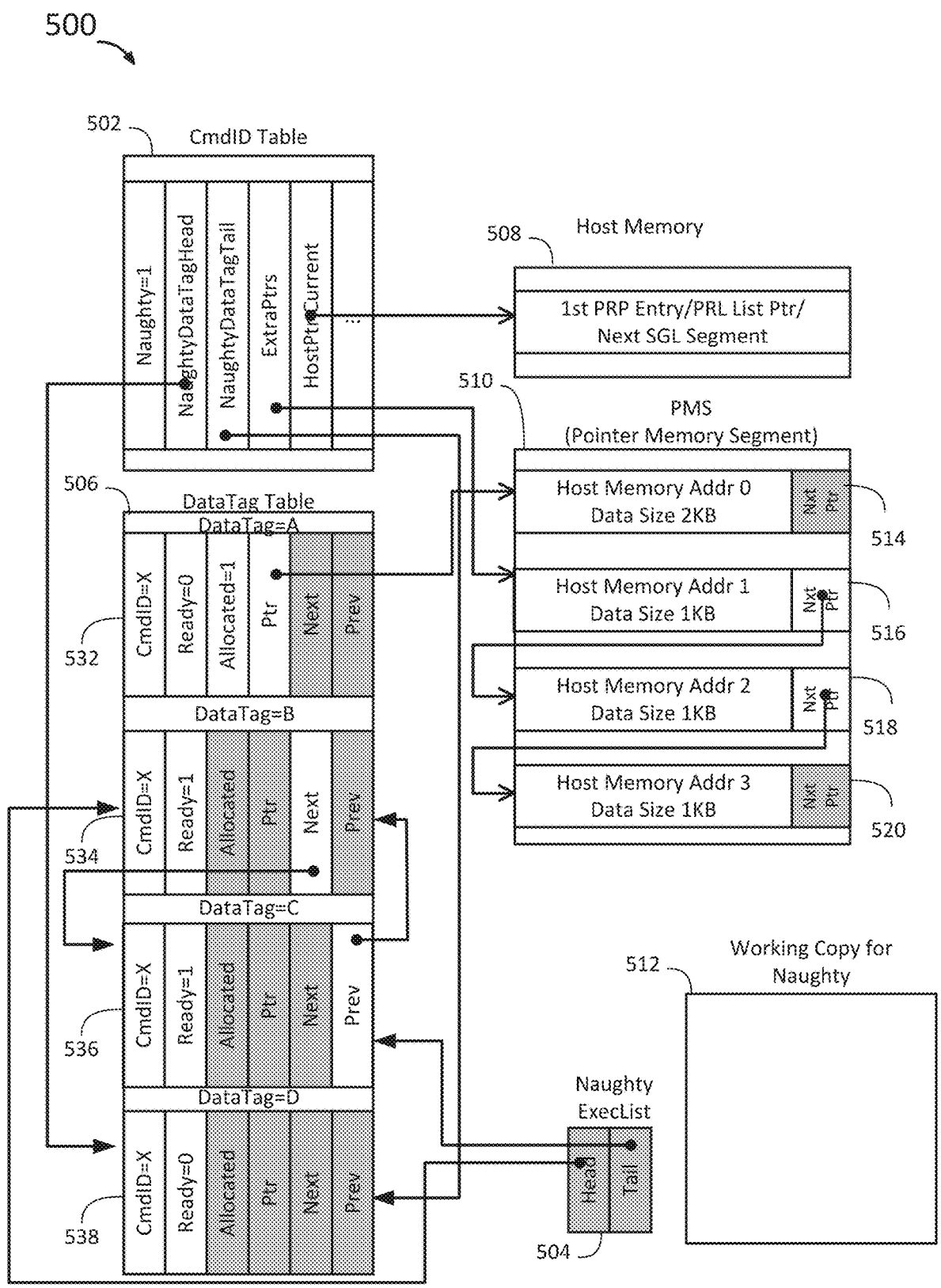
FIG. 5F shows a step in the processing of a plurality of typical and atypical data descriptors.

In FIG. 5F, the DDMA controller 108 retrieves data tag D 538 and adds it to the data tag memory 506, to the end of the per command list. Data tag D 538 is not yet ready, and so is not added to the naughty execution list 504.

Figure 5G:
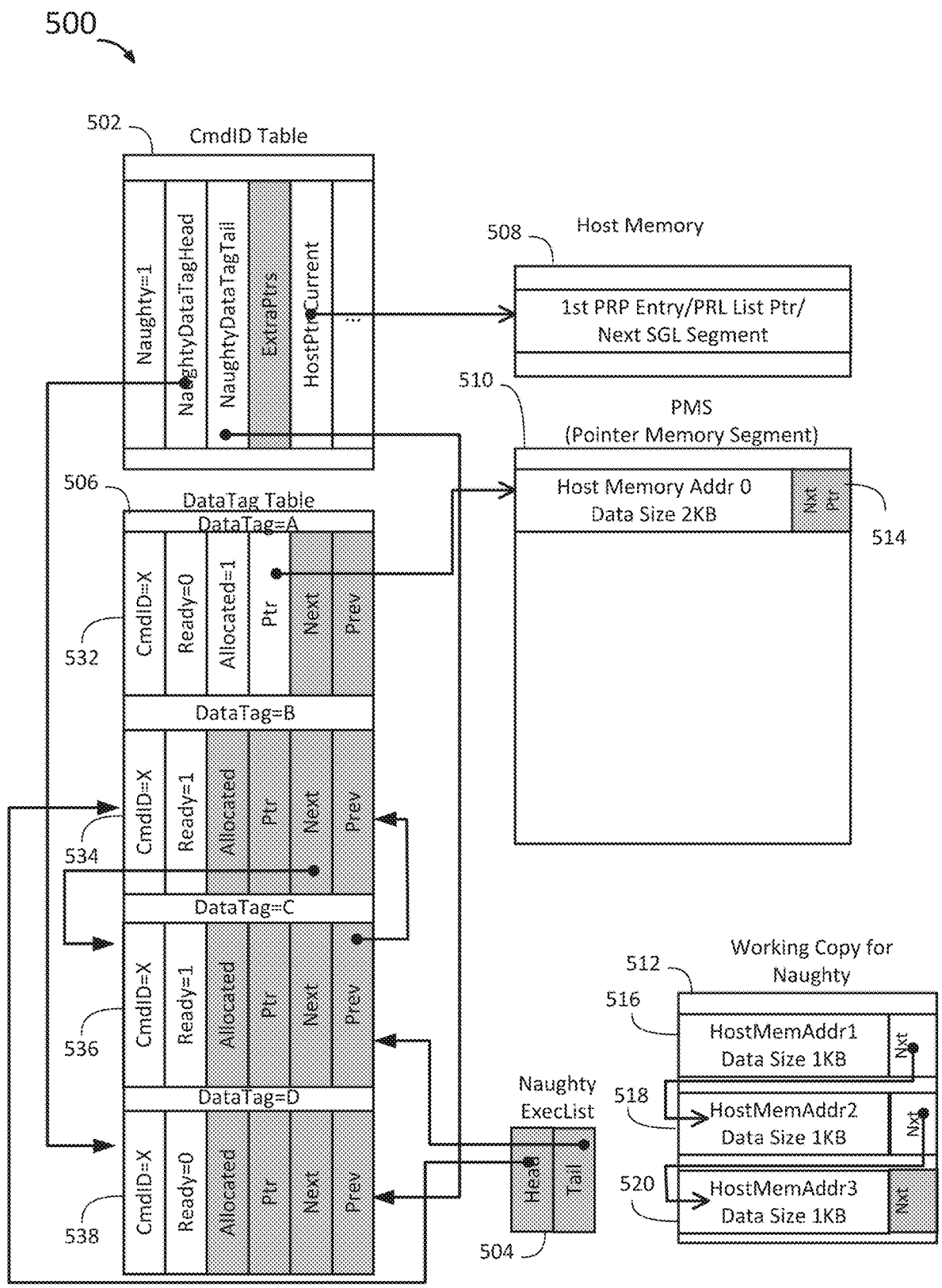
FIG. 5G shows a step in the processing of a plurality of typical and atypical data descriptors.

In FIG. 5G, data tag B 534 is at the head of the naughty execution list 504 and the DDMA controller 108 begins to process data transfer request tag B 534 by moving data descriptor '1' 516, data descriptor '2' 518, and data descriptor '3' 520 to the working copy for the naughty list 512. In some embodiments the working copy for the naughty list 512 is another list in the descriptor memory segment 510.

Figure 5H:
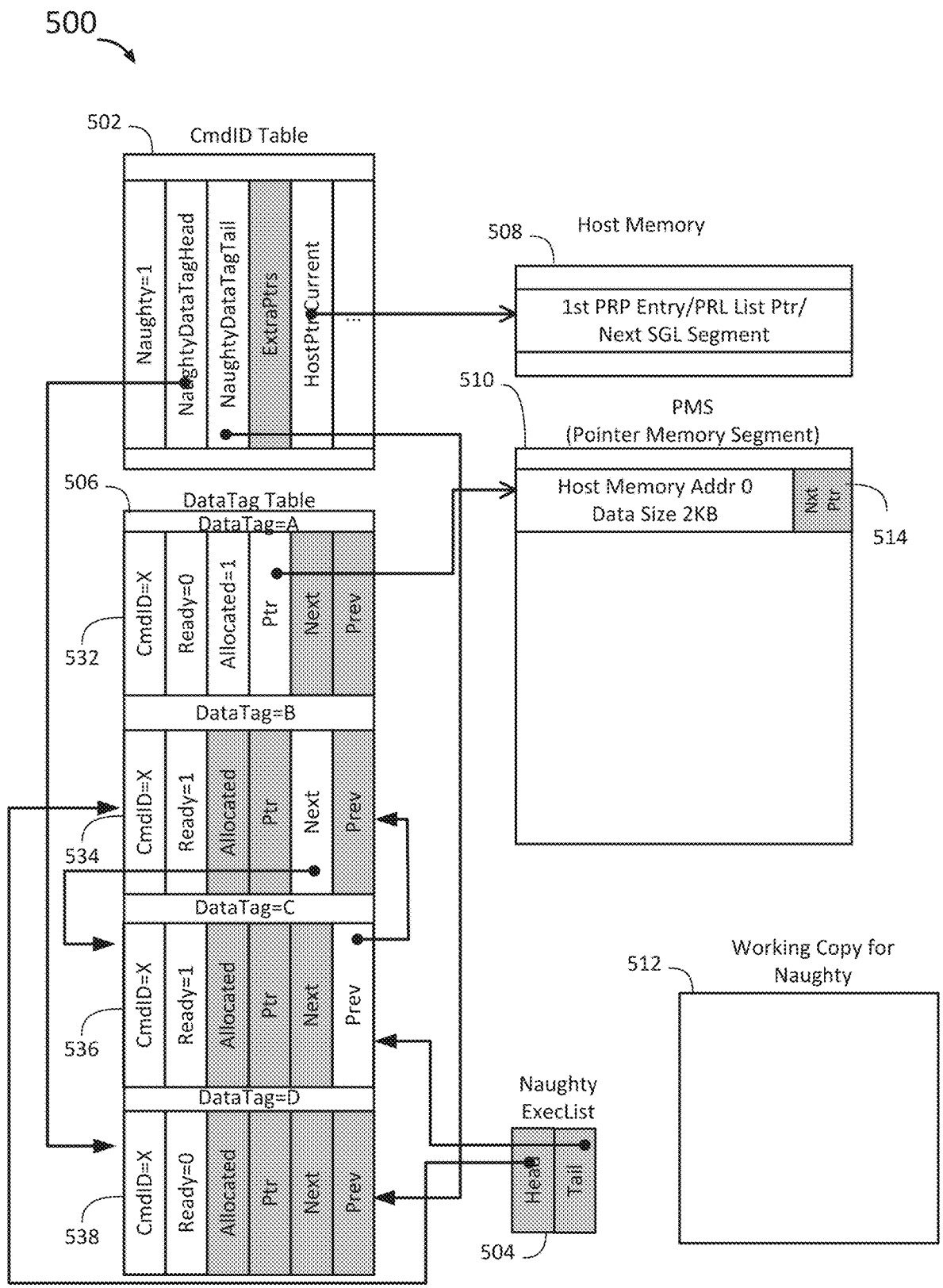
FIG. 5H shows a step in the processing of a plurality of typical and atypical data descriptors.

In FIG. 5H, the DDMA controller 108 transfers data associated with data descriptor '1' 516, data descriptor '2' 518, and data descriptor '3' 520 to the host 102, and the descriptors are removed from the working copy for naughty list 512 and from the local RAM 110. However, the data tag B 534 is not yet complete.

Figure 5I:
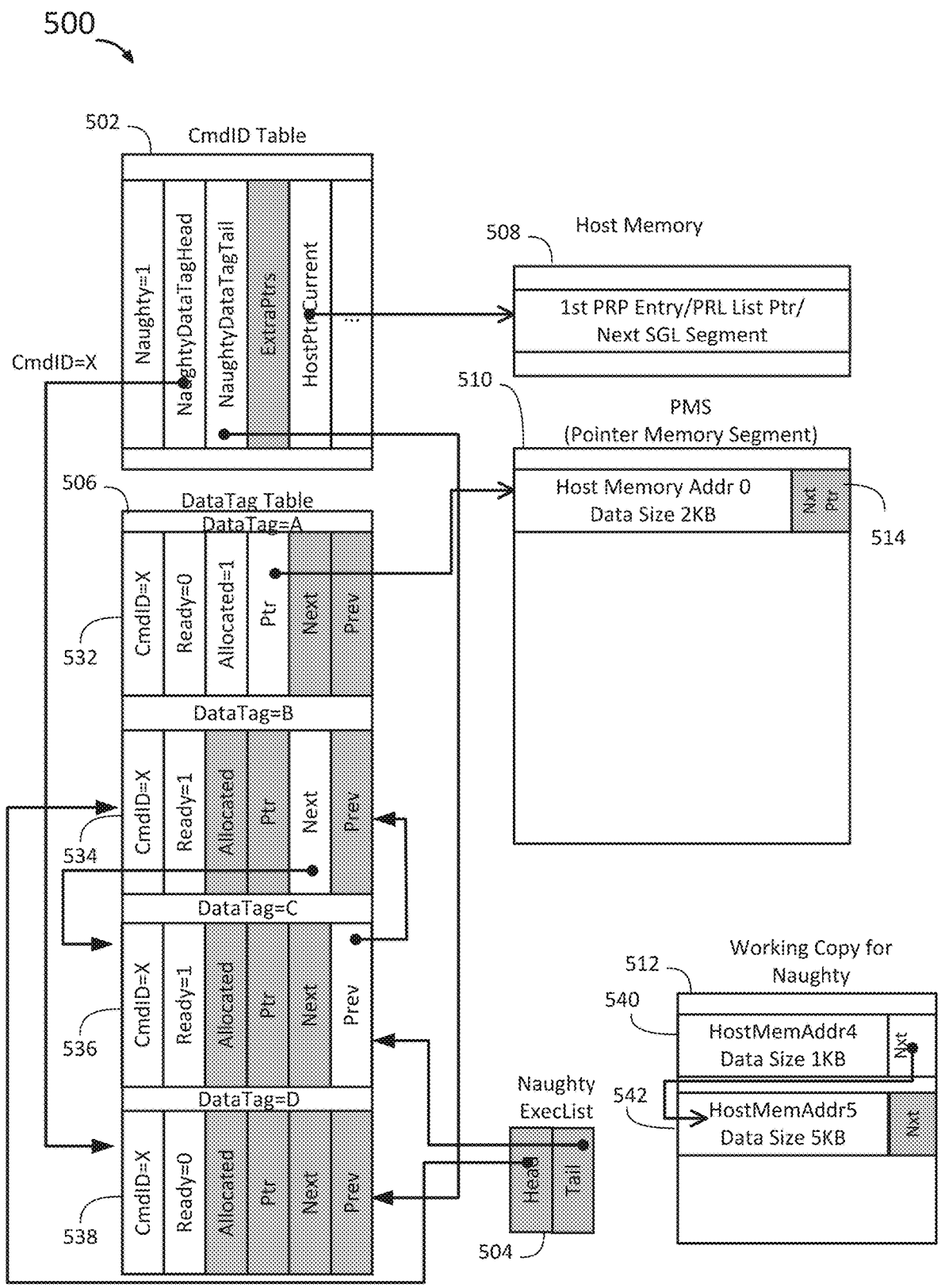
FIG. 5I shows a step in the processing of a plurality of typical and atypical data descriptors.

In FIG. 5I, the DDMA controller 108 fetches an additional 64 bytes of descriptors associated with the data tag from host memory 508 and updated the command ID table 502 appropriately. The DDMA controller 108 retrieves data descriptor '4' 540 and 5 KB data descriptor '5' 542 and stores the data descriptors in the working copy for naughty list 512 to complete the transfer of data t tag B 534.

Figure 5J:
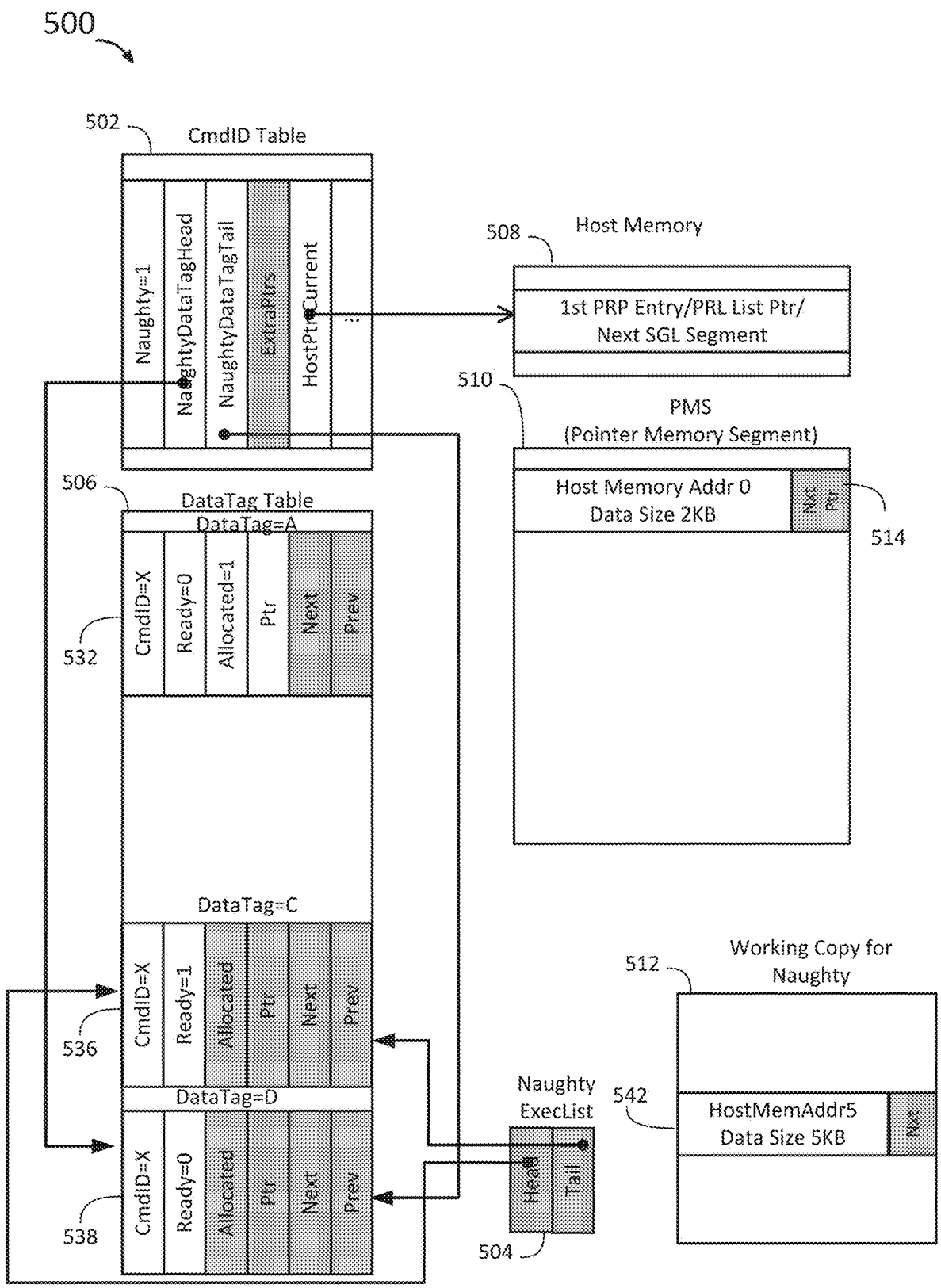
FIG. 5J shows a step in the processing of a plurality of typical and atypical data descriptors.

In FIG. 5J, the DDMA controller 108 retrieves and transfers the data associated with data descriptor '4' 540 to complete the processing of data tag B 534. Data tag B 534 is completed and removed from the data tag table 506.

Figure 5K:
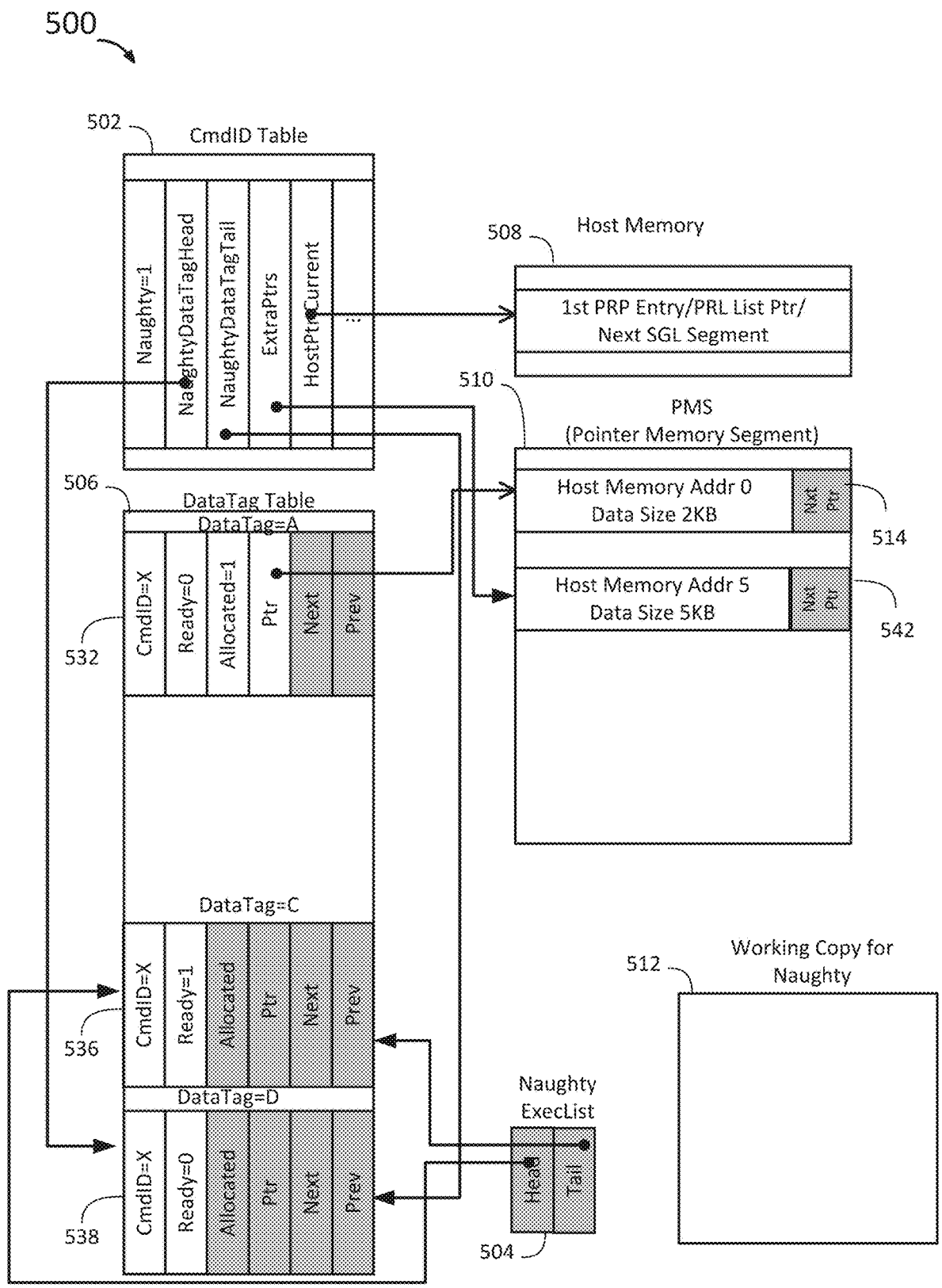
FIG. 5K shows a step in the processing of a plurality of typical and atypical data descriptors.

In FIG. 5K, the DDMA controller 108 has completed the transfer of data tag B 534. Data descriptor '5' 542 is not associated with the data tag B 534 and is moved from the working copy for naughty list 512 to the extra descriptors list in descriptor memory segment 510.

Figure 5L:
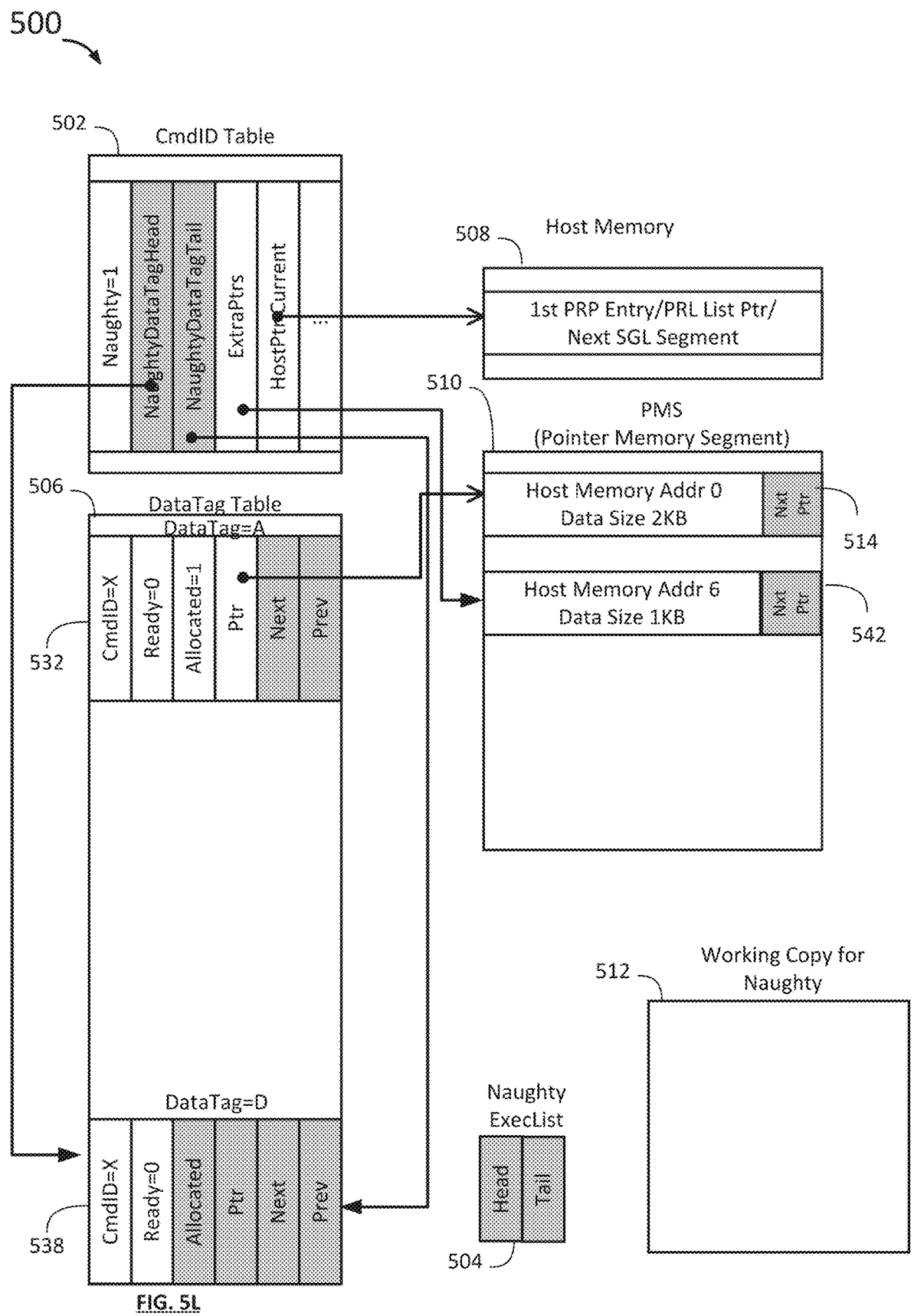
FIG. 5L shows a step in the processing of a plurality of typical and atypical data descriptors.

In FIG. 5L, the DDMA controller 108 processes data tag C 536 as it is the head of the naughty execution list 504. Because the data descriptor '5' 542 does not correspond to a next data descriptor, the DDMA controller moves the data descriptor '5' 542 to the working copy for naughty list 512, and then transfers the associated data. After the DDMA controller 109 finishes transferring the data associated with data tag C 536, the data tag C 536 is removed from the data tag memory 506. As data descriptor '5' 542 has only been partially consumed it is updated and removed from the working copy for naughty list 512 and stored in the descriptor memory segment 510 as a 1 KB data descriptor '6' 542.

Figure 5M:
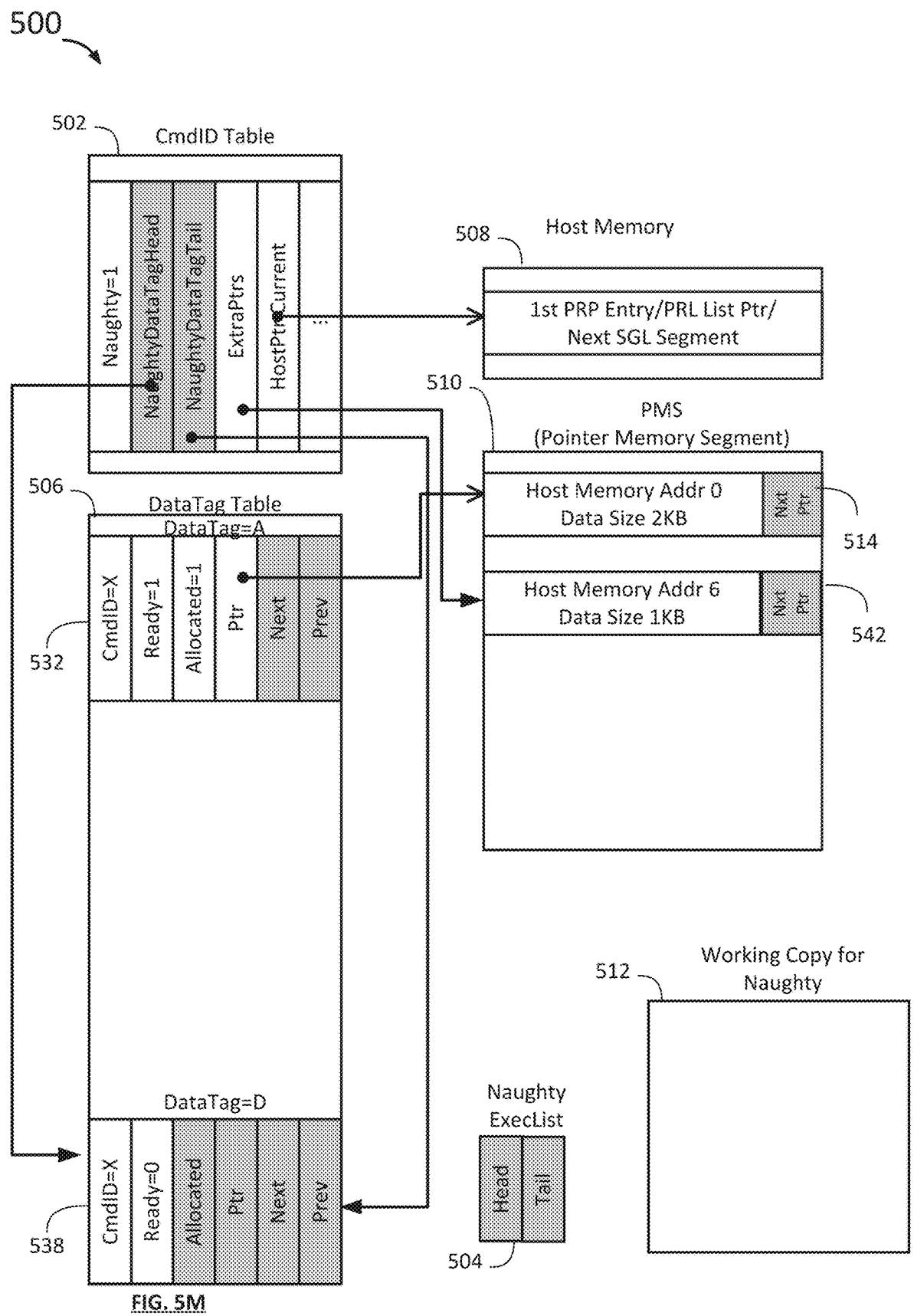
FIG. 5M shows a step in the processing of a plurality of typical and atypical data descriptors.

In FIG. 5M, data tag A 532 becomes ready and the ready indicator indicates ready. In FIG. 5N, the DDMA controller 108 transfers the data associated with data tag A 532 to the host 102. Because data tag A 532 is a typical data tag, it can be processed and data transferred to the host as soon as the data becomes ready. Data tag D 538 is left in the data tag memory 506 along with the associated data descriptor '6' 542 in the descriptor memory segment 510. Because data tag B 534 and data tag C 532 have been processed and transferred, data tag D 538 can be transferred when it is ready and is the head of the naughty execution list 504, as there are no preceding data tags in the order.

While the DDMA controller 108 processes data tag A 532, data tag B 534, data tag C 536, and tag D 538, other items can be continuously added to the data tag memory 506. Other typical data tags associated with other commands which are retrieved by the DDMA controller 108 can be added to the data tag memory 506 and processed out of order when the data becomes available for transfer.

In some embodiments, only one buffer at a time processes atypical data tags, while all other buffers process typical data tags in order to efficiently utilize the buffers to complete the read data transfer requests. In some embodiments, the number of buffers which can be used simultaneously for processing or transfer of atypical data tags is more than one, for example two or three.

Figure 6:
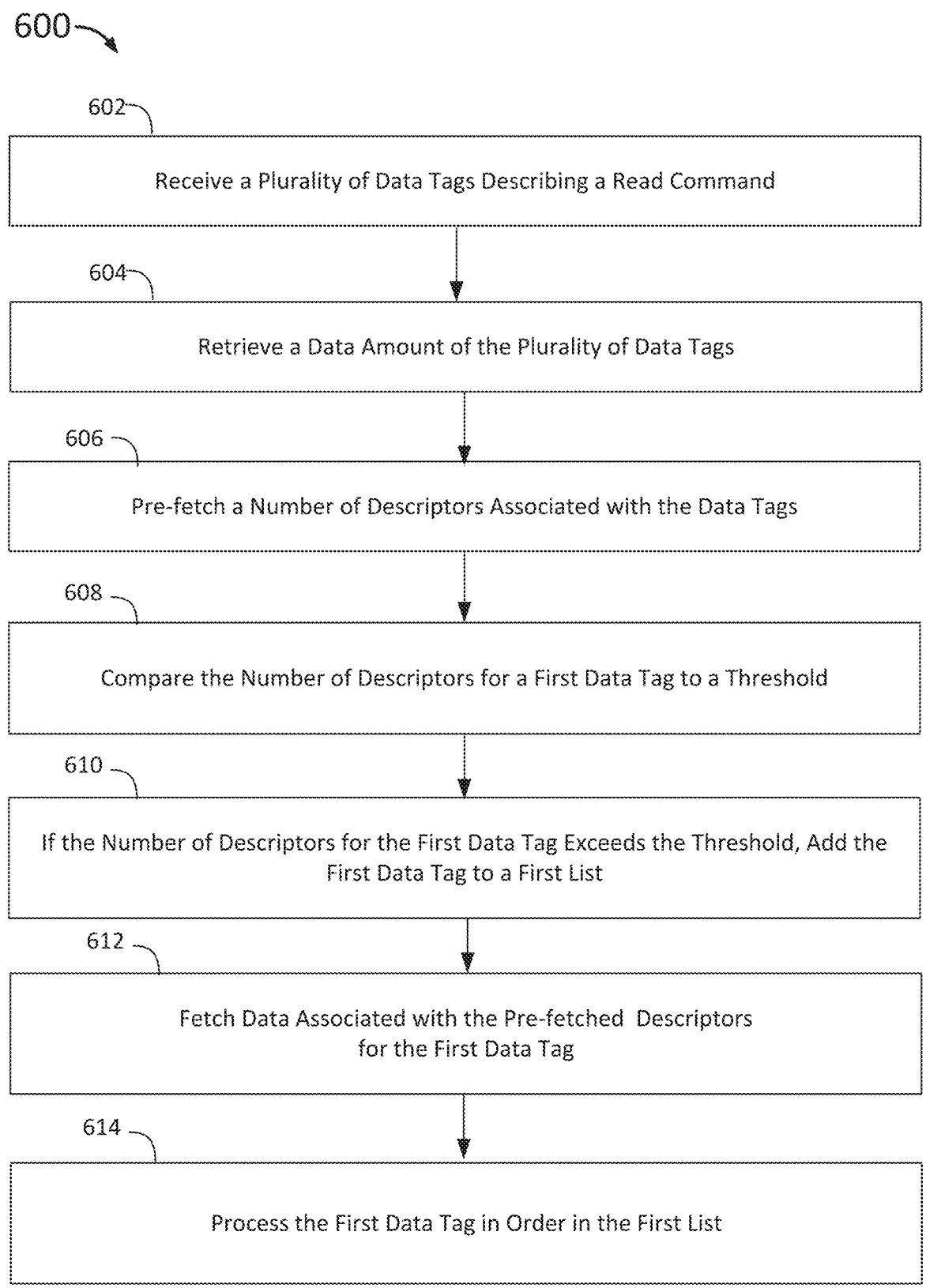
FIG. 6 shows a flow chart that illustrates a method of processing a read command.

FIG. 6 shows a flow chart 600 that illustrates a method of processing a read command. At step 602, a DDMA controller 108 receives a plurality of data tags describing a read command from the command controller 106. At step 604, the DDMA controller 108 retrieves a number of the plurality of data tags. In some embodiments, the DDMA controller 108 retrieves a pre-set size amount of data tags, for example 4 KB of data.

At step 606, the DDMA controller 108 pre-fetches a set number of descriptors associated with the data tags. In some embodiments, the DDMA controller 108 pre-fetches a pre-set size amount of descriptors associated with the plurality of data tags. At step 608, the DDMA controller 108 compares the number of descriptors for a first data tag to a threshold set in the hardware registry.

If the number of descriptors for the first data tag exceeds the threshold number, at step 610, the DDMA controller 108 adds the first data tag to a first list. The first data transfer request is considered to be atypical and will be processed in order, while any typical data tags previously fetched and processed by the DDMA controller are processed out of order as the data becomes available for transfer.

At step 612, the data associated with the pre-fetched descriptors for the first data tag is retrieved in the backend. The DDMA controller 108 will not fetch any remaining descriptors describing the first data tag until the first data tag is ready for execution, i.e., the first data tag is marked as ready, pre-fetched descriptor data is available, and the first data tag is at the head of an execute list.

At step 614, the first data tag is processed in order in the first list. This occurs after the pre-fetched descriptor data has been retrieved and is available for transfer and the first data tag is at the head of the execute list. When the first data tag is at the head of the first list and data associated with the first data tag is ready to be transferred, the first data tag is moved to a second list. When the first data tag is at the head of the second list, the associated data is transferred. If additional descriptors are required to complete transfer of data associated the data tag, the descriptors are fetched and the data is transferred as it becomes available. Subsequent data tags in the list can be processed only after the first data tag is processed and associated data transferred (e.g., in order).

If the number of descriptors associated with the first data tag does not satisfy the threshold, the DDMA controller 108 transmits the data associated with the first data tag when the associated data is ready (e.g., out of order).

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

What is claimed is:

1. A semiconductor storage device, comprising:
   a Data Direct Memory Access (DDMA) controller configured to:
   segment each read command of a plurality of read commands into a plurality of data tags associated with the read command, the plurality of data tags associated with a plurality of data transfer descriptors stored in the host device, the plurality of data transfer descriptors indicating one or more locations of requested data associated with the plurality of data tags;
   retrieve, from the host device, one or more data transfer descriptors associated with one or more of the plurality of data tags, wherein a first data tag has an associated number of data transfer descriptors corresponding to one or more locations of the requested data in contiguous blocks of a memory;
   determine if the number of data tag descriptors associated with the first data tag satisfies a threshold;
   if the number of data tag descriptors associated with the first data tag does not satisfy the threshold:
     move the first data tag to a first list, the first list having an order including a first position at a head of the first list;
     move the first data tag to a second list when (i) the first data tag is at the head of the first list and (ii) requested data associated with the first data tag is ready to be transferred; and
     transmit then requested data to the host device when the first data tag is at a head of the second list.

2. The semiconductor storage device of claim 1, wherein if the number of data transfer descriptors associated with the first data tag does satisfy the threshold, the DDMA controller is further configured to:
   transmit the requested data to the host device when the requested data is ready.

3. The semiconductor storage device of claim 1, further comprising a plurality of buffers, wherein each buffer transmits to the host device the data associated with one of a plurality of data tags in the second list.

4. The semiconductor storage device of claim 3, wherein only one of the plurality of buffers at a time is used to execute a data transfer of data associated with the first data tag having a number of descriptors which does not satisfy the threshold.

5. The semiconductor storage device of claim 1, wherein the threshold is a predetermined amount stored in a register.

6. The semiconductor storage device of claim 1, wherein the threshold is a predetermined number of data transfer descriptors associated with a data tag.

7. The semiconductor storage device of claim 1, wherein if the number of data transfer descriptors associated with the first data tag does not satisfy the threshold, subsequent data tags associated with a same read command are considered to not satisfy the threshold.

8. The semiconductor storage device of claim 7, wherein the subsequent data tags associated with the same read command are added to an end of the first list.

9. The semiconductor storage device of claim 1, wherein processing the first data tag comprises accessing the requested data in a flash memory.

10. The semiconductor storage device of claim 2, wherein if the number of data transfer descriptors associated with the first data tag satisfies the threshold amount and a number of data transfer descriptors associated with a second data tag also satisfies the threshold amount, the DDMA controller is configured to transfer data associated with whichever of the first data tag and the second data tag for which requested data becomes available first.

11. The semiconductor storage device of claim 10, wherein if a number of data transfer descriptors associated with a third data tag does not satisfy the threshold amount, the third data tag and any subsequent data tags are added to the first list.

12. The semiconductor storage device of claim 1, wherein the data transfer descriptors include metadata descriptors.

13. The semiconductor storage device of claim 12, wherein the metadata descriptors are not counted in the number of data transfer descriptors compared to the threshold.

14. The semiconductor storage device of claim 12, wherein the metadata descriptors are counted in the number of data transfer descriptors compared to the threshold.

15. The semiconductor storage device of claim 1, further comprising an on-chip Random Access Memory (RAM) configured to store a list of the plurality of data tags and the first list.

16. The semiconductor storage device of claim 15, wherein if the number of data transfer descriptors associated with the first data tag does not satisfy the threshold, retrieved descriptors associated with the first data tag are stored in the on-chip RAM.

17. A method of fetching Direct Memory Access (DMA) descriptors for commands to a semiconductor storage device, the method comprising:
   for a first command, segmented into a plurality of data tags describing the command, each data tag associated with a plurality of DMA descriptors, at a head of a command list in an on-chip Random Access Memory (RAM):
     determining a number of DMA descriptors associated with a first data tag describing the first command, wherein the number of DMA descriptors correspond to locations of requested data in contiguous blocks of memory; and
     comparing the number of DMA descriptors associated with the first data tag to a threshold value;
   if the number of DMA descriptors associated with the first data tag does not satisfy the threshold value, processing the first data tag by:
     storing the first data tag in a first list;
     when (i) the first data tag is at a head of the first list and (ii) data associated with the first data tag is ready, moving the first data tag to a second list;
     retrieving a plurality of additional DMA descriptors associated with the first data tag; and
     executing data transfer of a data associated with the first data tag when the first data tag reaches a head of the second list.

18. The method of claim 17, wherein if the number of DMA descriptors associated with the first tag request satisfies the threshold value, the method further comprises processing the first data tag by:
   executing data transfer of the data associated with the first data tag when the data associated with the first data tag is available.

19. The method of claim 18, wherein if the number of DMA descriptors associated with the first data tag satisfies the threshold value and a number of DMA descriptors associated with a second data tag also satisfies the threshold value, the method further comprises transferring data associated with whichever of the first data tag and the second data tag for which data becomes available first.

20. The method of claim 19, wherein if a number of DMA descriptors associated with a third data tag does not satisfy the threshold value, the method comprises adding the third data tag and any subsequent data tags to the first list.

* * * * *